(12) United States Patent
Sweet

(10) Patent No.: US 6,306,304 B1
(45) Date of Patent: Oct. 23, 2001

(54) AEROBIC TREATMENT OF SEPTIC TANK EFFLUENT

(76) Inventor: Richard A. Sweet, 155 Gray Rd., Falmouth, ME (US) 04105

( * ) Notice: Subject to any disclaimer, the term of this patent is extended or adjusted under 35 U.S.C. 154(b) by 0 days.

(21) Appl. No.: 09/510,778

(22) Filed: Feb. 23, 2000

(51) Int. Cl.[7] .................................................. C02F 3/02
(52) U.S. Cl. ...................... 210/629; 210/620; 210/739; 210/758; 210/138; 210/220
(58) Field of Search .................................... 210/620, 629, 210/739, 758, 138, 220

(56) References Cited

U.S. PATENT DOCUMENTS 4,877,532 * 10/1989 Haentjens .
5,314,622 * 5/1994 Stirling .

* cited by examiner

Primary Examiner—Chester T. Barry
(74) Attorney, Agent, or Firm—William F. Hamrock, PA

(57) ABSTRACT

An aerobic treatment apparatus and method of treating effluent transported from a septic tank. The effluent flows into a large enclosed holding tank and a small enclosed production tank located in the holding tank. The effluent within the production tank is intermittently pumped through an air modified venturi flow system and through directional jets from which it mixes with and increases oxygen content in the effluent in the holding tank. A timer in communication with the pump controls the period of pumping. The treated and mixed effluent is transported to a disposal field.

12 Claims, 1 Drawing Sheet

AEROBIC TREATMENT OF SEPTIC TANK EFFLUENT

BACKGROUND OF THE INVENTION

The invention relates to the treatment of effluent from a septic tank and, more particularly, to the treatment of effluent from the septic tank in a large holding tank having a second smaller tank therein under aerobic conditions which is then discharged into a disposal field.

Septic tank systems using the anaerobic method are widely used in disposing of sewage material from buildings and homes. Generally, the septic system includes a septic tank from which the effluent flows into a disposal field. In some cases, a pump in a pump tank is used to lift the effluent from the septic tank to the disposal field which can be in a higher elevation from the septic tank.

These septic tank systems collect all of the wastewater sewage from the building or home and treat the sewage material in the anaerobic environment. While the septic tank generally retains most of the organic solids therein which gravitate to the bottom of the tank, the liquid effluent flows out of the tank to the disposal field where it is intended to percolate downwardly into the surrounding soil. However, varying amounts of organic particles remain in the anaerobic treated liquid effluent flowing from the septic tank. Anaerobic bacteria feed on the organic particles which produces and becomes part of a slimy mass which then coats and adheres to all surfaces with which it comes in contact. This becomes a serious problem in the septic tank system disposal fields wherein the slime coats and adheres to the soil surrounding the disposal field thereby clogging the soil pores and considerably reducing the permeability of the soil. Frequently, the permeability of the surrounding soil is so reduced that the clogged disposal field fails completely causing the liquid effluent to percolate upwardly thereby completely saturating the entire surface and especially the top surface of the disposal field resulting in an environmentally disastrous condition. This condition is prevalent with a large number of septic tank systems and must be corrected at considerable labor and expense in many cases. However, it is particularly a serious problem with small size septic tank systems where there is a limited sized disposal field area available for use for reworking, and/or there are limited financial means available to be continuously faced with the problem.

It is known that sliming in the disposal field is greatly reduced in an aerobic environment thereby providing a longer life for the disposal field. Much of the previous improvements have been directed to modifying large septic tank systems which are designed generally for municipal treatment plants to provide for higher and more complex flows of effluent solids and liquid with expensive apparatus. Very few of the improvements are applicable to improving smaller systems by means of a simple and inexpensive method and apparatus. The present invention is directed to a simple and inexpensive method and apparatus for aeration of septic tank effluent which is applicable to small septic tank systems.

SUMMARY OF THE INVENTION

In order to provide a simple and inexpensive improved method and apparatus, it has been discovered that the contaminated liquid from the septic tank must be treated and sprayed in a continuous method with oxygen by means of a venturi/pump arrangement in a small aerobic production tank located within a larger holding tank. The treated and sprayed effluent is then treated in the larger holding tank from which it is fed by gravity or may be pumped into the disposal field. This is accomplished by filtering out large organic waste from the effluent from the septic tank and passing the filtered effluent into the large tank. The small aerobic production tank located at the bottom of the large tank then fills up with the effluent through openings at its sides. A timer controls and activates the operation of the pump. When the pump is activated by the timer, the pump forces the effluent through the venturi where it is exposed to oxygen and into a jet sprayer which sprays oxygenated effluent into the effluent material present in the large tank. An air line attached to the venturi mixes air with effluent where it is jet sprayed in a circular motion into the effluent material in the holding tank. When the timer deactivates the switch and pump, aerobic bacteria in the effluent material in the holding tank combines with the oxygen until the oxygen level drops to a predetermined minimum low level which is not sufficient to maintain the preferred aerobic environment of the effluent material. At this time, the timer signals the pump which again initiates the aerating process in the aerobic production tank.

In light of the above, the present invention provides an arrangement of elements illustrated in the preferred embodiment which are hereinafter set forth in sufficient detail to enable those skilled in the art to clearly understand the function, operation, construction and advantages of it when read in conjunction with the accompanying drawings.

BRIEF DESCRIPTION OF THE DRAWING

The invention will be described in detail with reference to the accompanying drawing wherein.

DESCRIPTION OF THE PREFERRED EMBODIMENT

Figure 1:
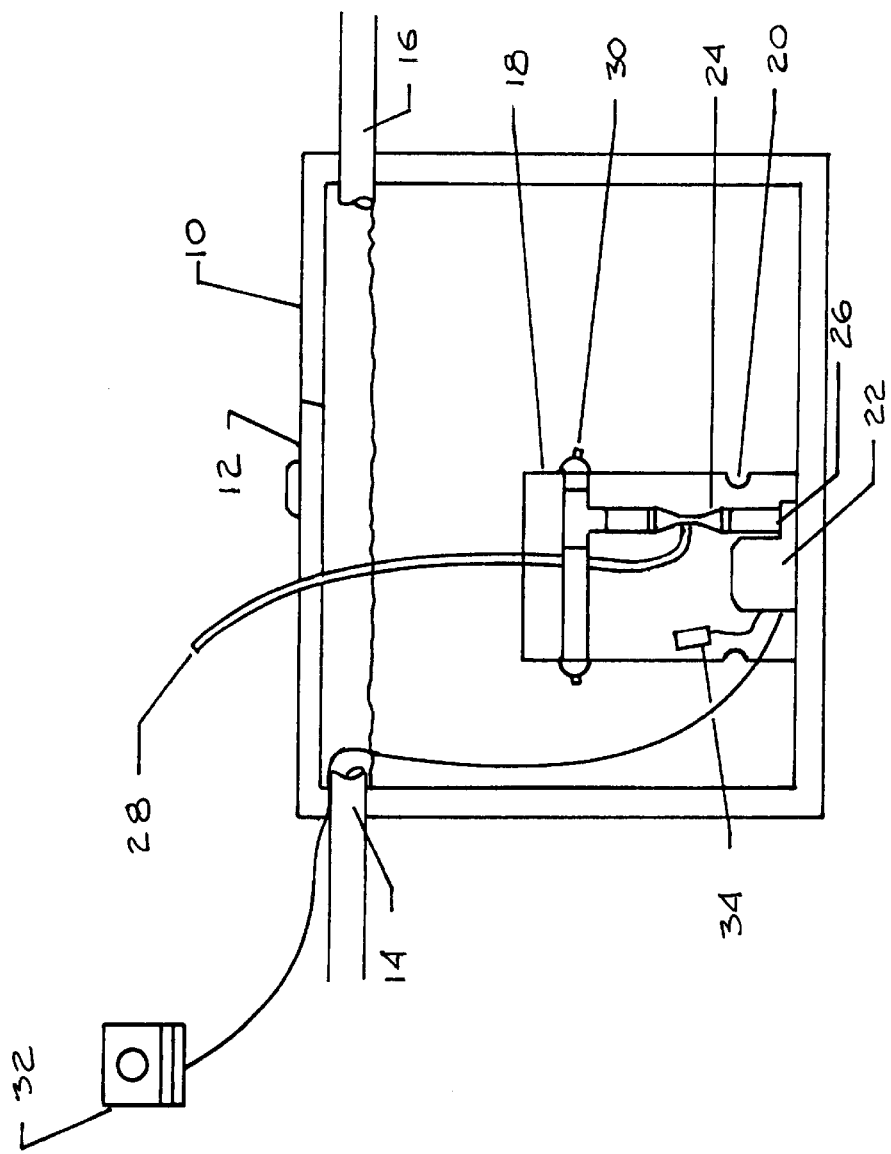
FIG. 1 is an overall schematic representation of the preferred method and apparatus of the invention.

The present invention is not just another treatment of septic tank material but actually provides a continuous method for maintaining the effluent from the septic tank in an aerobic environment before it enters the disposal field and also increases the oxygen level in the disposal field whereby in both instances creating a deterrent to the formation of a slimy mass.

Referring to the drawings, shown in FIG. 1 is a schematic overall representation of the aerobic treatment method and apparatus of the invention. The holding tank 10 is shown enclosed at all sides and the bottom and a removable observation cover 12. The holding tank has a capacity of about 300 hundred gallons. An inlet pipe 14 located near the top of the holding tank is in communication with the discharge from the septic tank, not shown, which carries the septic tank raw effluent into the holding tank. A filter screen, not shown, is connected to inlet pipe 14 at the outlet of the septic tank which filters out large organic waste in the effluent thereby resulting in substantially only liquid effluent flowing into the holding tank. Outlet pipe 16 located preferably slightly lower than inlet pipe on the opposite side of the holding tank carries the overflow of aerated liquid effluent from the holding tank to the disposal field, not shown.

A small aerobic production tank 18 having inlet port openings 20 on its upper side surfaces is secured within the bottom interior generally central area of holding tank 10. The generally rectangular shaped small aerobic production tank is about twelve inches by eighteen inches and has a capacity of about eight gallons. The inlet port openings are located at a predetermined height above the bottom of the small tank to allow the liquid effluent in the holding tank to flow through the upper inlet ports filling the small tank with the raw liquid effluent at the predetermined height while preventing any raw effluent sludge from entering the inlet ports of the small tank from the bottom of the holding tank. Enclosed and secured to the bottom of small tank 18 is effluent pump 22 which becomes completely engulfed within the liquid effluent flowing into the small tank. The effluent pump has a horse power rating of about 0.4 which allows the pump to efficiently pump the liquid effluent through the system. A venturi 24 as depicted in the drawing is attached to the pump's outlet 26 results in restricted venturi flow from the pump. An air tube 28 extending downwardly from above the ground is attached to the venturi allowing air to be drawn into the ventori. The air entering the venturi then mixes with the liquid effluent being pumped by the effluent pump in the small tank. The aerated effluent mixture leaving the venturi passes through directional jets 30 into the the large body of raw effluent which has filled the holding tank. The directional jets are positioned to provide a circular motion to the effluent being pumped into raw or treated effluent in the holding tank thereby thoroughly mixing the pumped liquid effluent with the large body of raw and treated effluent in the holding tank.

A timer 32 as depicted in FIG. 1 located on the ground surface above the holding tank. The timer is connected to effluent pump 22 and to a low level float switch 34 within the holding tank whereby the timer controls the operation of the effluent pumping. When the raw effluent from the septic tank passes through inlet pipe 14 into the large holding tank 10, the effluent initially starts filling the holding tank while completely filling small aerobic production tank 20 thereby completely engulfing effluent pump 24 therein and then completes filling the holding tank to the invert pipe 18. The rising level of the effluent in the holding tank places the float switch 36 in the on-position predetermined by the level of effluent in the holding tank. Timer 32 then activates the float awitch 36 and effluent pump 24 for a predetermined specified period of time determined by the level of oxygen in the holding tank's aerated effluent material. Upon reaching the predetermined desired aerated concentration, timer 34 deactivates the float switch and effluent pump. While the effluent pump system is deactivated, aerobic bacteria in the effluent in the holding tank continues to combine with oxygen in the aerated effluent material until the level of free oxygen drops to a predetermined minimum level which is too low to maintain the aerobic environment of the effluent material. Whenever the predetermined minimum low level of aerated concentration occurs, the timer continuously activates the effluent pumping system to raise the oxygen level in the effluent material to the desired aerated concentration; and likewise the timer continuously deactivates the pumping system when the predetermined desired aerated concentration occurs.

It appears that it is the continuous process and the small size of aerobic production tank 22 while enclosing effluent pump 24 engulfed in the liquid effluent in combination with the venturi spraying and mixing of the liquid effluent into the raw and treated effluent in the holding tank 10 which control and reduce the sliming in the effluent in the disposal field not previously obtainable in such a small unit.

From the foregoing detailed description of the present invention, it will be seen that the invention effectively overcomes the deficiencies of prior art methods and provides significant advantages over prior art devices. Changes may be made in the combination and arrangement of elements heretofore setforth in the specification and shown in the drawing without departing from the spirit and scope of the invention.

What is claimed is:

1. Aerobic treatment apparatus for septic tank effluent comprising:
    means for transporting the effluent from the septic tank to a separated enclosed holding tank,
    said holding tank having a uppermost inlet means for receiving the effluent and an uppermost outlet means for discharging treated effluent,
    an enclosed aerobic production tank enclosed within the holding tank and located on the bottom central area thereof, the production tank having an upright structure with upper effluent inlet means therein,
    an effluent pump enclosed within said production tank, the pump having an effluent inlet means and an effluent outlet means, which outlet means in communication with an enclosed air modified venturi flow system means,
    said venturi flow system means in communication with an enclosed directional jets means,
    said directional jet means in communication with the interior of said holding tank.

2. The apparatus according to claim 1 wherein a switch means is in communication with the pump.

3. The apparatus according to claim 2 wherein a timer is in communication with the pump and switch means.

4. The apparatus according to claim 1 wherein an air intake pipe means is in communication with the venturi flow system means.

5. The apparatus according to claim 1 wherein the means for transporting the effluent from the septic tank has a filtering means.

6. The apparatus according to claim 1 wherein the upper effluent inlet means on the the aerobic production tank comprises port openings.

7. The apparatus according to claim 6 wherein the volume of the aerobic production tank is about eight gallons.

8. The apparatus according to claim 7 wherein the volume of the holding tank is about three hundred gallons.

9. The apparatus according to claim 1 wherein the uppermost outlet means is positioned slightly lower than the uppermost inlet means.

10. A method of treating effluent from a septic tank comprising:
    transporting the effluent to an upper inlet in a large enclosed holding tank,
    flowing the effluent into the holding tank and into a enclosed aerobic production tank within the holding tank,
    pumping the effluent in the production tank through an enclosed venturi flow system and through an enclosed directional jet means into the effluent in the holding tank,
    mixing the pumped effluent with the effluent in the holding tank,
    transporting the mixed treated effluent from the holding tank to a disposal field.

11. The method of claim 10 wherein the effluent pumped through the venturi flow system is air modified.

12. The method of claim 11 wherein a timer controls intermittent pumping of the effluent from the production tank into the mixed treated effluent in the holding tank.

* * * * *